US012209773B2

(12) United States Patent
Wehmeyer et al.

(10) Patent No.: US 12,209,773 B2
(45) Date of Patent: Jan. 28, 2025

(54) ELECTRIC HEATER AND ELECTRIC HEATING SYSTEM

(71) Applicant: KANTHAL GMBH, Moerfelden-Walldorf (DE)

(72) Inventors: Lukas Wehmeyer, Moerfelden-Walldorf (DE); Markus Mann, Moerfelden-Walldorf (DE)

(73) Assignee: Kanthal GmbH, Moerfelden-Walldorf (DE)

( * ) Notice: Subject to any disclaimer, the term of this patent is extended or adjusted under 35 U.S.C. 154(b) by 0 days.

(21) Appl. No.: 18/716,086

(22) PCT Filed: Dec. 5, 2022

(86) PCT No.: PCT/EP2022/084483
§ 371 (c)(1),
(2) Date: Jun. 3, 2024

(87) PCT Pub. No.: WO2023/104746
PCT Pub. Date: Jun. 15, 2023

(65) Prior Publication Data

US 2024/0418406 A1 Dec. 19, 2024

(30) Foreign Application Priority Data

Dec. 7, 2021 (EP) .................................... 21212996

(51) Int. Cl.
*F24H 3/04* (2022.01)
*H05B 3/12* (2006.01)
*H05B 3/42* (2006.01)

(52) U.S. Cl.
CPC ............ *F24H 3/0405* (2013.01); *H05B 3/12* (2013.01); *H05B 3/42* (2013.01); *F24H 2250/02* (2013.01);
(Continued)

(58) Field of Classification Search
CPC ..... F24H 3/0405; F24H 2250/02; H05B 3/12; H05B 3/42; H05B 2203/016; H05B 2203/022
See application file for complete search history.

(56) References Cited

U.S. PATENT DOCUMENTS 927,173 A 7/1909 Schlueter
4,233,494 A 11/1980 Pawlik et al.
2017/0094725 A1 * 3/2017 Mann ...................... H05B 3/48

FOREIGN PATENT DOCUMENTS

CN 118284776 A * 7/2024 ............ F24H 1/105
GB 980454 A 1/1965
WO WO-2021191155 A1 * 9/2021 .............. H05B 3/12

OTHER PUBLICATIONS

International Search Report and Written Opinion dated Mar. 30, 2023, issued in corresponding International Patent Application No. PCT/EP2022/084483.

* cited by examiner

*Primary Examiner* — Shawntina T Fuqua
(74) *Attorney, Agent, or Firm* — Morgan, Lewis & Bockius LLP

(57) ABSTRACT

An electric heater for a fluid comprises a plurality of electrically conductive tubes arranged in a bundle for resistive heating having an axial extension, electrical connectors arranged between the tubes. The electric heater is configured for the fluid to flow through the bundle in direct contact with inner and outer surfaces of the tubes. Each of the tubes has an outer diameter within a range of 6-40 mm and an outer diameter to wall thickness ratio within a range of 5-15 or within a range of 7-12. A ratio between a total cross-sectional surface area in between the tubes and a total cross-sectional area inside the tubes lies within a range of
(Continued)

−10% to +30% or within a range of −5% to +25% of a ratio between the outer and inner diameters of one tube.

16 Claims, 4 Drawing Sheets

(52) U.S. Cl.
CPC .. *H05B 2203/016* (2013.01); *H05B 2203/022* (2013.01)

ELECTRIC HEATER AND ELECTRIC HEATING SYSTEM

TECHNICAL FIELD

The invention relates to an electric heater for a fluid and to an electric heating system for a fluid.

BACKGROUND

Electric heaters and heating systems comprising electrically heated tubes, through which a fluid to be heated is conducted are known.

U.S. Pat. No. 4,233,494 discloses a throughflow heater for fluids, in particular, an air heater for use in regenerating a carbon-dioxide adsorber in an air-rectification system. Air is pumped from an upper chamber in a cylindrical housing through Ni—Cr steel heating tubes arranged in parallel groups to a lower chamber communicating with a carbon-dioxide adsorber. The tube groups are suspended at their upper ends from respective $Al_2O_3$ ceramic holder plates seated on flanges projecting into respective openings of a carrier plate in turn removably fastened to the inside of the housing. The tubes in each group are connected in series with one another to a voltage source.

A further option, as disclosed in US 927173, is to direct the fluid to be heated not only through the tubes but also on outsides of the tubes. US 927173 discloses an electric heater having resistance members in the form of nickel tubes. In a housing, a large number of thin-walled nickel tubes are mounted through insulation in transverse sheet metal walls. Air to be heated flows through the nickel tubes and outside the nickel tubes from an air intake to an air outlet of the electric heater.

SUMMARY

Although known electric heaters utilising electrically heated tubes, such as disclosed in U.S. Pat. No. 4,233,494 and US 927173, provide for an efficient heating of a fluid, there is still a demand for more effective and efficient fluid heaters.

It would be advantageous to achieve an efficient electric heater for a fluid and/or an effective and efficient electric heating system for a fluid. In particular, it would be desirable to provide a compact electric heater for a fluid. To better address one or more of these concerns, an electric fluid heater for a fluid and/or an electric heating system for a fluid having the features defined in one or more of the independent claims is provided.

According to an aspect of the invention, this is achieved by an electric heater for a fluid, the electric heater comprising a plurality of electrically conductive tubes arranged in a bundle for resistive heating having an axial extension, electrical connectors arranged between the tubes of the plurality of electrically conductive tubes, and electrical conductors configured for connecting the plurality of tubes with an external electric power supply. The electric heater is configured for the fluid to flow through the bundle in parallel with the axial extension and in direct contact with inner and outer surfaces of the tubes. Each of the tubes has an outer diameter within a range of 6-40 mm and an outer diameter to wall thickness ratio within a range of 5-15 or within a range of 7-12. In a cross section of the bundle perpendicularly to the axial extension, a ratio between a total cross-sectional surface area in between the tubes and a total cross-sectional area inside the tubes lies within a range of −10% to +30% or within a range of −5% to +25% of a ratio between the outer diameter and an inner diameter of one of the tubes.

Since the electric heater is configured for the fluid to be heated to flow through the bundle in direct contact with inner and outer surfaces of the tubes, since the tubes have an outer diameter within a range of 6-40 mm and an outer diameter to wall thickness ratio within a range of 5-15 or within a range of 7-12, the tubes are of a thin-walled type which when electrically heated as such provide conditions for an even temperature distribution between radially inner and outer portions of the tube walls, while providing sufficient mechanical stability for such fluid heater designs. Moreover, since a ratio between a total cross-sectional surface area in between the tubes and a total cross-sectional area inside the tubes lies within a range of −10% to +30% or within a range of −5% to +25% of a ratio between the outer diameter and an inner diameter of one of the tubes, there is provided for a substantially even distribution of the (mass) flow of fluid through insides of the tubes and along outsides of the tubes in the bundle. Accordingly, available fluid contacting heating surfaces of the tubes are efficiently utilised for heating a fluid flowing through the electric heater. The electric heater provides a high fluid heating capacity per volume of the heater i.e., the electric heater is compact.

More specifically, the present electric heater provides in the bundle for a through flow area inside the tubes to be substantially equal to a through flow area in-between the tubes. Thus, a substantially equal transfer of heat to the fluid passing through the insides of the tubes and the fluid passing in-between the tubes is ensured. The fluid flow inside the tubes and the fluid flow outside the tubes thus, will be subjected to an even increase in temperature as it flows through the bundle of the electric heater. In combination with the defined tube diameter range and the outer diameter to wall thickness ratio, any large difference in temperature between the fluid flowing inside the tubes and the fluid flowing outside the tubes towards an outlet end of the bundle thus, is avoided. This means that stress in the walls of the tubes caused by a temperature difference between outsides and insides of the tubes i.e., thermal stress caused by radial temperature differences, is avoided.

Moreover, a pressure drop of the fluid flow outside and inside a heating tube, respectively is kept substantially equal. The pressure drop is predominantly defined by frictional forces between the fluid and the surfaces of the tubes. The frictional forces increase with decreasing density due to increasing temperatures along the axial direction which lead to acceleration of the fluid velocity in quadratic dependency. An equal temperature increase of the fluid inside and outside the tubes is achieved by dividing the mass flow rates by adjusting the spacing of the tubes proportional to the transferred heat that is mainly proportional to the heating surface areas of said heating tubes and can be achieved by an arrangement in a ratio described before.

Generally, the electric heater may be devised for large mass flow rates and high temperatures with a power rating in the Megawatt range. The electric heater may be utilised as such or it may form part of a fluid flow heating system configured for heating e.g., air, hydrogen, hydrocarbons and other gases or liquids to high temperatures, such as 600-1250° C. or even higher, and for large scale heating processes in the Megawatt range. Inter alia for these purposes, the electric heater comprises the directly electrically heated, thin-walled tubes specifically arranged in the bundle with respect to the cross-sectional areas formed inside and outside the tubes and related to the inner and outer diameters of the tubes to form a compact, effective, and efficient heating system. The directly electrically heated tube may alternatively be referred to as active tubes.

The electric heater for a fluid may herein alternatively be referred to as electric heater or simply as heater. The electric heater may be utilised for heating a fluid, such as a gas in an industrial process. The heater may for example be utilised in an industrial process. The fluid heated in the heater may be an energy carrier in an industrial process and/or the fluid may be utilised as a heat source in an industrial process and/or the fluid may be process fluid utilised in the industrial process.

The electric heater provides directly electrically heated tubes and thereby directly energized tubes, which are void of any additional heating elements or insulation material. In other words, the interior of the thin tubes lack any heat generating members extending therethrough. Accordingly, there are no active internal elements nor insulation layers, such as wire heating elements or mineral insulated heating elements, arranged in the tubes. Thus, there is provided basis for an uncomplicated design of the electric heater, in particular of the bundle of tubes and makes is suitable for large power ratings. The electric energy supplied to the heater during use thereof is efficiently transformed into heat which is transferred to the fluid to be heated in the heater without any thermal barrier that would decrease the heaters effectivity i.e., the capability to provide high outlet temperature and/or would decrease its efficiency i.e., would provide higher heat losses, lower power density, and increased pressure drop.

The electrically conductive tubes may have a resistivity of between 0.05 Ω·m and 5 μΩ·m. Such a resistivity may be provided by the materials discussed below.

Accordingly, the relevant materials and their resistivity differ distinctly from those of ceramic catalyst carriers, which have a very different resistivity and will not be suitable to build large heaters or to provide required surface loads within typical available line voltages described later.

An electric current, when flowing through the electrically conductive tubes, causes the tubes to heat up. A material of the tubes may be an aluminium oxide forming material. The aluminium oxide will form a protective layer and thereby, the tubes may withstand both high temperatures and other harsh environment or fluid conditions and thus, may enable heating of different gases to high temperatures. The tubes may comprise alternative materials, which may be utilised e.g., when the fluid to be heated is a non-oxidising fluid such as hydrogen or nitrogen.

The electric heater is of a simple construction requiring few different components. Although the bundle of the electric heater may comprise hundreds or even thousands of individual tubes, the tubes may be of one kind or a limited number of different kinds. This, inter alia, leads to the heater being operationally reliable during use in an industrial process.

The electric heater may be arranged in any desired and therefore suitable location where a fluid is to be heated. suitably, in a location where the fluid to be heated can be guided through the bundle e.g., in a conduit, a pipe, a duct, or a housing. The electric heater may be arranged in a housing, optionally together with one or more further electric heaters, forming an electric heating system as discussed below.

Herein, the plurality of electrically conductive tubes alternatively may be referred to as the plurality of tubes or simply as tubes.

In the bundle, the tubes of the plurality of electrically conductive tubes may be arranged in parallel to each other or substantially in parallel to each other, at a distance from each other.

The electrical connectors are arranged between the tubes of the plurality of electrically conductive tubes and connected to the tubes in a manner that provides for an electric current from the external electric power supply to flow through the tubes of the bundle, in series, in parallel, or a combination of series and parallel.

The external electric power supply may comprise mains power or may be connected to mains power via a transformer for adapting a voltage of electric current supplied to the electric heater.

The outer diameter to wall thickness ratio is also referred to as Standard Dimensional Ratio, SDR. Accordingly, SDR is defined as the ratio of the outer diameter of the tube and the wall thickness of the tube. Tubes having the herein defined SDR within a range of 5-15 or within a range of 7-12 are typically considered to be thin-walled tubes. In the present context, tubes within the larger SDR range of 5-15 provide adequately large heat transfer surfaces i.e., surfaces on the insides and outsides of the tubes, to provide an efficient heat transfer to the fluid to be heated and to provide the above discussed even temperature distribution between radially inner and outer portions of the tube walls. Tubes within the smaller SDR range of 7-12 provide not only the adequately large heat transfer surfaces and the even temperature distribution between radially inner and outer portions of the tube walls, but also an adequate strength and electrical resistance for tubes made out of relevant materials, such as the below exemplified materials i.e., the material in each tube is utilised in an optimal manner.

The above-mentioned ratio between the total cross-sectional surface area in between the tubes and the total cross-sectional area inside the tubes lying within a particular range of the ratio between the outer diameter and an inner diameter of one of the tubes provides for a substantially even distribution of the flow rate of fluid (volume or mass per unit time) in the bundle along the heat transfer surfaces provided by the insides of the tubes and along the heat transfer surfaces provided by the outsides of the tubes. Accordingly, available fluid contacting heat transfer surfaces on insides and outsides of the tubes are efficiently utilised for heating the fluid flowing through the electric heater while stress in the walls of the tubes caused by radial temperature difference is avoided, or at least is kept at a minimum.

Additionally, the temperature increase of the fluid flowing inside and outside the tubes is kept equal, or substantially equal. Therefore, in a steady state operation of the heater, a ratio between the fluid flowing inside the tubes and the fluid flowing outside the tubes will remain constant at various flow rates flowing through the heater as the pressure drop is equal or substantially equal both inside and outside the tubes.

Concerning the above-defined ratio between the total cross-sectional surface area in between the tubes and the total cross-sectional area inside the tubes lying within the higher range of −10% to +30% of the ratio between the outer and inner diameters of one of the tubes, sufficiently good heat transfer properties are provided by the heater. Specifically, the above discussed advantages of even distribution of heat transfer between insides and outsides of the tubes and the related low heat stress and uniform pressure drop at variable flow rates are manifested within this range. The range essentially relates to in practice applied manufacturing tolerances of the heater and potentially necessary components such as the electrical connectors, spacer elements, and bracing elements between the tubes or inside the tubes. A very even distribution of heat transfer between insides and outsides of the tubes and an absent, or at least an essentially absent, heat stress in a radial direction of the tubes characterises this range.

Concerning the above-defined ratio between the total cross-sectional surface area in between the tubes and the total cross-sectional area inside the tubes lying within the lower range of −5% to +25% of the ratio between the outer and inner diameters of one of the tubes, very good heat transfer properties are provided by the heater. For instance, this may be achieved when e.g., the electrical connectors, spacer elements, and bracing elements between the tubes or inside the tubes are optimized for low pressure drop.

According to embodiments, each tube of the plurality of electrically conductive tubes may be arranged at an angle within a range of 0-15 degrees or 0-5 degrees to an adjacent tube. In this manner, the tubes may be arranged in parallel or substantially in parallel to each other in the bundle or the tubes may be arranged inclined to each other in the bundle.

For instance, the bundle may have a certain conicity due to the angle between individual tubes.

Alternatively, some of the individual tubes may be arranged with an angle therebetween pointing in a first direction and some of the individual tubes may be arranged with an angle therebetween pointing in an opposite second direction, thereby providing along the axial extension of the bundle, a bundle with a substantially similar cross section perpendicularly to the axial extension.

An angle between the individual tubes in the bundle may be utilised for mechanically stabilising the tubes within the bundle and the bundle inside a housing, a reactor, or a duct. Such stabilising may be utilised e.g., in embodiments wherein during use of the heater, the bundle is arranged with the axial extension having a vertical component, such as with the axial extension extending vertically.

In embodiments wherein each tube of the plurality of electrically conductive tubes is arranged at an angle >0 degrees to an adjacent tube, the above discussed ratio between the total cross-sectional surface area in between the tubes and the total cross-sectional area inside the tubes lying within a particular range of the ratio between the outer diameter and an inner diameter of one of the tubes may be fulfilled according to at least one of: an average over an entire extension of the bundle of tubes, at a middle portion of the bundle seen along its extension, and/or throughout the entire bundle.

According to embodiments, the electric heater may comprise spacer elements arranged between the tubes to support the tubes in the bundle. The spacer elements may be electrically non-conductive. The spacer elements may be arranged with interspaces along the axial extension of less than 40% of a total length of the bundle along the axial extension. In this manner, the tubes within the bundle and the bundle in a housing or a duct may be stabilised.

The spacer elements arranged with interspaces along the axial extension of less than 40% of a total length entails that at least two spacer elements are arranged between two adjacent tubes seen along the axial extension. For instance, two or three spacer elements may be arranged along one tube along the axial extension. Depending on a total length of the bundle, the number of spacer elements along one tube may be larger than three.

The spacer elements may abut against the tubes to support the tubes. Each spacer element may abut against all tubes surrounding a relevant spacer element.

The spacer elements may have any suitable shape, such as tubular, cylindrical, spherical, box-shaped, etc.

According to embodiments, the tubes may comprise structural elements configured for form-locking engagement with the spacer elements. In this manner, it may be ensured that the spacer elements remain positioned within the bundle when the tubes are subjected to thermal movements.

The term form-locking engagement relates to an engagement or connection that utilises mating elements to prevent in particular, axial displacement of a spacer element in relation to one or more tubes.

According to embodiments, the electric heater may comprise bracing elements arranged within the tubes for mechanically supporting the tubes.

Since the tubes are thin tubes i.e., having a high SDR, and they may be heated to temperatures at which they lose at least some of their inherent stability, the bracing elements may ensure that the thin tubes remain sufficiently form stable for them to not collapse at softening temperatures of the relevant materials. Bracing elements could be made from the same or similar material as the tubes to e.g., improve the voltage distribution by homogenizing the electrical potential of each of the tubes at a portion where the bracing elements are arranged. Alternatively, the bracing elements could be made from a material with higher softening temperatures such as ceramic materials.

According to embodiments, the tubes may consist of an electrically conducting material for active resistance heating or more than one electrically conducting material for active resistance heating, and wherein the electrically conducting material may be the same in all the tubes or different and may be selected from the group of iron-chromium-aluminium alloy (FeCrAl alloy), i.e. alloys which will form an alumina layer on the outside of the product, nickel-based alloy, tungsten-based alloy, or molybdenum-based alloy. In this manner, the heater may be operated at high temperatures and, depending on the flow rate of the fluid, high fluid temperatures may be achieved. High fluid temperatures may be utilised in many industrial processes.

According to embodiments, the plurality of electrically conductive tubes may be configured to be electrically heated up to a temperature of 1300° C., such as up to a temperature within a range of 600-1300° C. In this manner, the fluid to be heated may be heated to high temperatures, which may be utilised in industrial processes.

Such a temperature or temperature range may be applied in heaters wherein the electrically conducting material is selected from any of the above-mentioned alloys.

According to some embodiments, such a temperature or temperature range may be applied in heaters wherein the electrically conducting material is a FeCrAl alloy or a Nickel-based alloy.

According to embodiments, the plurality of electrically conductive tubes may be configured to be electrically heated up to a temperature of 2050° C., such as up to a temperature within a range of 800-2050° C.

According to some embodiments, such a temperature or temperature range may be applied in heaters wherein the electrically conducting material is a tungsten-based alloy or a molybdenum-based alloy.

According to a further aspect, there is provided an electric heating system for a fluid comprising a housing and at least one electric heater according to any one of aspects and/or embodiments discussed herein. The at least one electric heater is arranged in the housing. A flow path for the fluid to be heated extends through the bundle and along the axial extension.

In this manner, an electric heating system to be installed in an industrial plant may be provided. The electric heating system provides the above discussed advantages of the electric heater.

The housing not only protects the electric heater but may also direct the fluid towards and/or through the bundle of the electric heater and may additionally be devised as a pressure vessel.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1A:
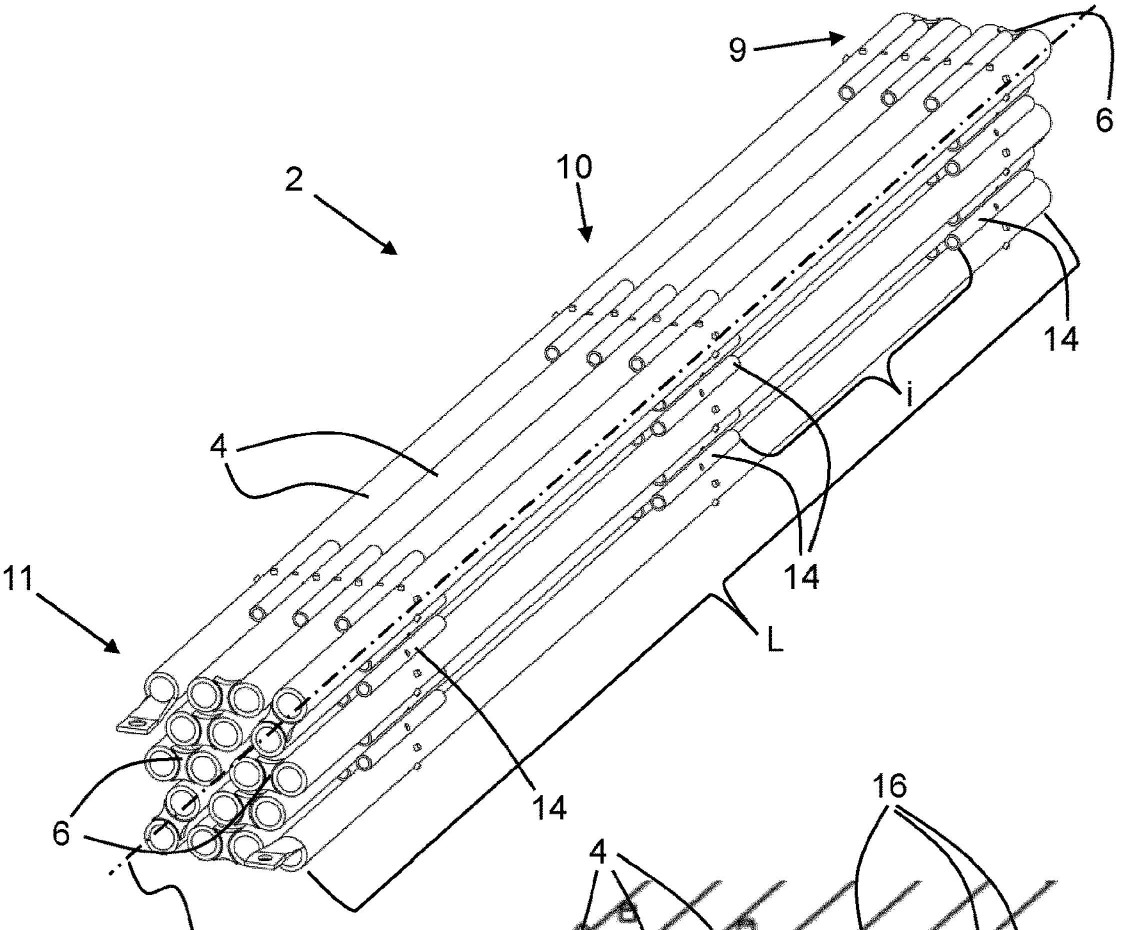
FIG. 1*a* illustrates an isometric view of an electric heater for a fluid according to embodiments.
Figure 1B:
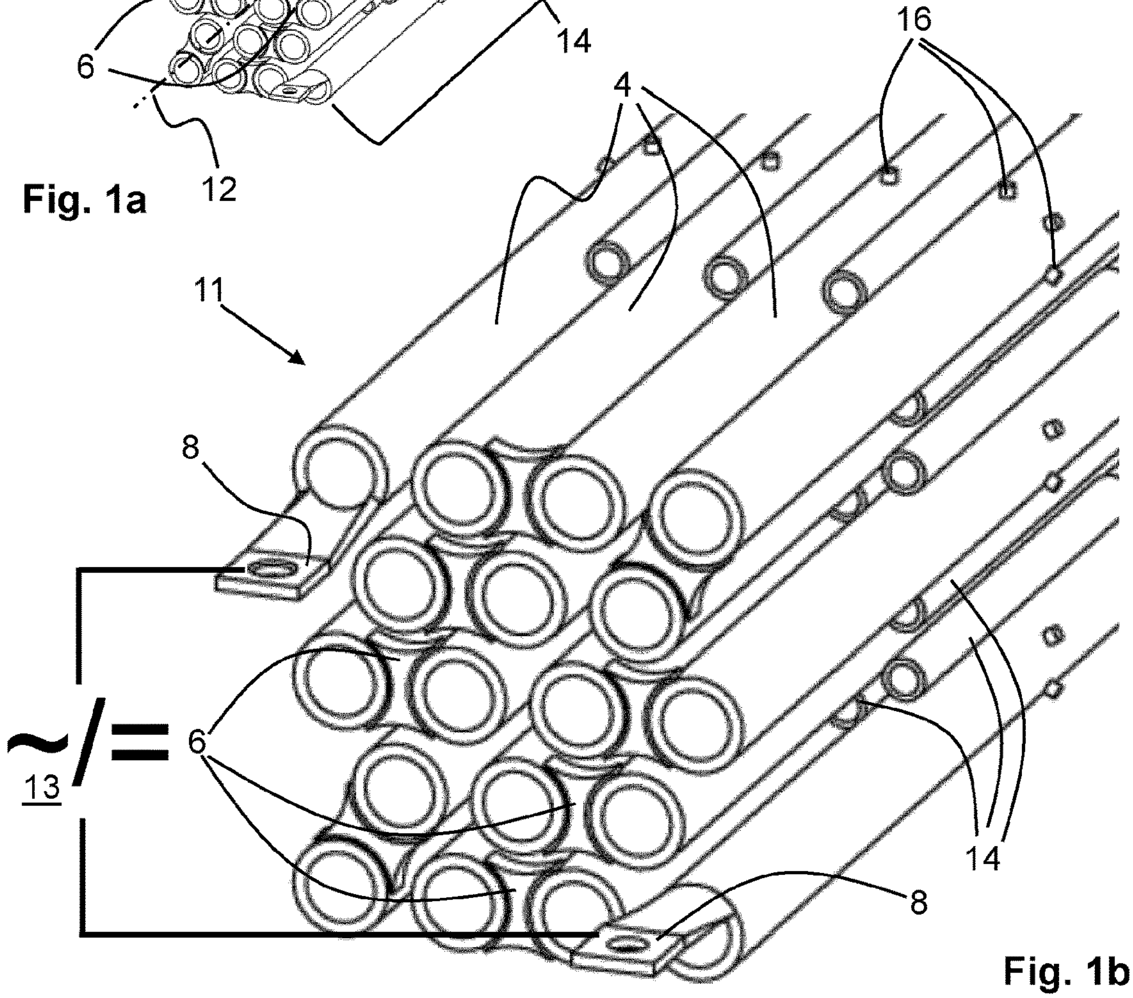
FIG. 1*b* shows an isometric view of an end portion of the electric heater of FIG. 1*b*.

FIG. 1*a* illustrates an isometric view of an electric heater 2 for a fluid according to embodiments. FIG. 1*b* shows an isometric view of an end portion of the electric heater 2.

The electric heater 2 may form part of an electric heating system as discussed below with reference to FIG. 5.

The electric heater 2 comprises a plurality of electrically conductive tubes 4, electrical connectors 6, and electrical conductors 8.

The tubes 4 are arranged in a bundle 10 for resistive heating. The bundle 10 has an axial extension 12. The electrical connectors 6 are arranged between the tubes 4 and are configure for conducting an electric current between the tubes 4. There are two electrical conductors 8, which are configured for connecting the plurality of tubes 4 with an external electric power supply 13. Each of the electrical conductors 8 is connected to a separate tube 4 of the tubes 4. However, even though not shown in the Figures, there could be more than two electrical conductors.

In use of the electric heater 2, an electric current flows via the electrical conductors 8 to/from the tubes 4 and between the tubes 4 via the electrical connectors 6.

Accordingly, the electric heater 2 provides directly electrically heated tubes 4.

The axial extension 12 of the bundle 10 may be a straight line drawn through a midpoint of cross-sectional areas of the bundle at each opposite end portion 9, 11 of the bundle 10.

The electric heater 2 is configured for the fluid to be heated to flow through the bundle 10 in parallel with the axial extension 12 and in direct contact with inner and outer surfaces of the tubes 4.

Figure 3:
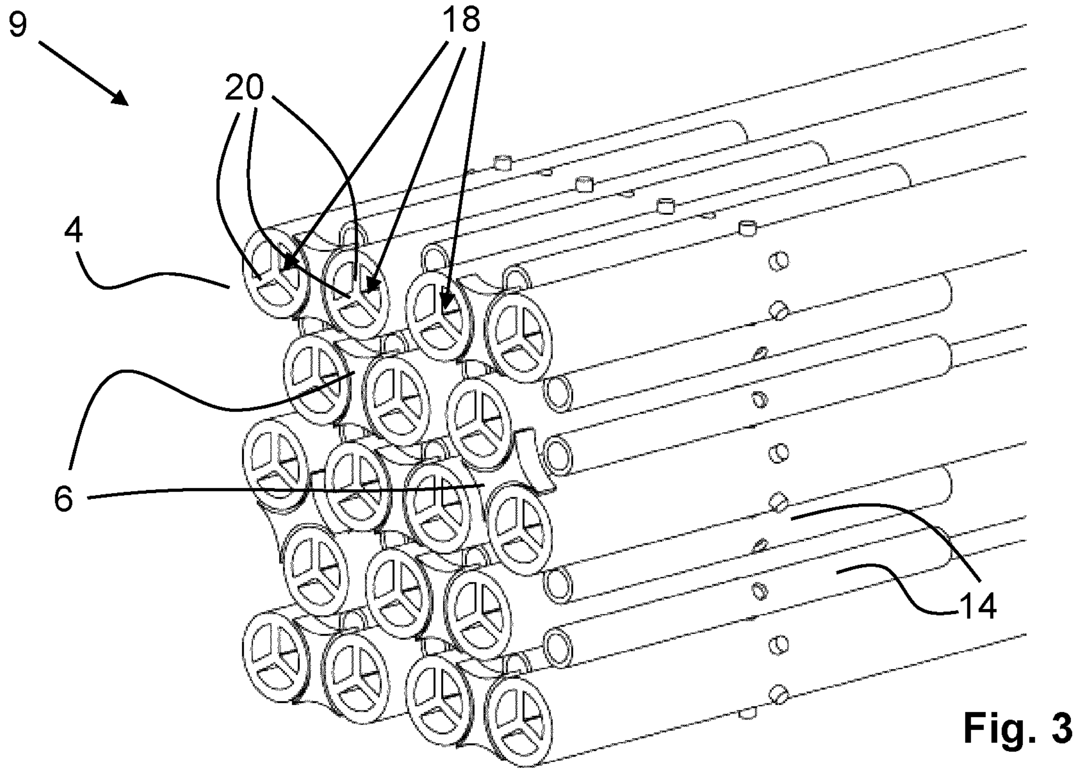

The bundle 10 has a hot end portion 9 i.e., at a fluid outlet end of the bundle 10 and a cool end portion 11 i.e., at a fluid inlet end of the bundle 10. The cool end portion 11 is shown in FIG. 1*b*. The hot end portion 9 is shown in FIG. 3 and also discussed further below.

The terms hot and cool are relative terms, meaning that during use of the electrical heater 2, the cool end portion 11 is typically colder than the hot end portion 9 as the fluid is heated as a function of the heater's axial extension 12 from the fluid inlet to the fluid outlet. A temperature at the cool end portion 11 may depend on the temperature of the fluid entering the heater 2. Accordingly, the cool end portion 11 does not have to have a low temperature during use of the heater 2.

Suitably, the electrical conductors 8 may be arranged at the cool end portion 11 of the bundle 10.

The tubes 4 have particular dimensions and are positioned in relation to each other such that a high heat flux to the fluid per volume of the heater 2 is achieved. See further below with reference to FIG. 2.

The electric heater 2 comprises spacer elements 14 arranged between the tubes 4 to support the tubes 4 in the bundle 10. The spacer elements 14 are electrically non-conductive.

The spacer elements 14 may abut against the tubes 4 to support the tubes 4 in relation to each other in the bundle 10. Each spacer element 14 may abut against all adjacently arranged tubes 4. That is, adjacent tubes 4 in the bundle 10 abut against the same spacer elements 14.

In the illustrated embodiments, each spacer element 14 abuts against three adjacent tubes 4 within the bundle 10, except for the outermost the spacer elements 14, which each abuts against two tubes 14. Depending on how the tubes are arranged within the bundle, the spacer elements may abut against more than three tubes.

Thus, the spacer elements 14 ensure that the tubes 4 are securely positioned in relation to each other within the bundle 10 while ensuring electrical insulation between the tubes 4 i.e., preventing electrical shortcut between the tubes 4.

At least two spacer elements 14 are arranged aligned along the axial extension 12 in respective interspaces between two adjacently arranged tubes 4. Such aligned spacer elements 14 are arranged with interspaces i along the axial extension 12.

According to some embodiments, the spacer elements 14 may be arranged with interspaces i along the axial extension 12 of less than 40% of a total length L of the bundle 10 along the axial extension 12.

At least two aligned spacer elements 14 are arranged between two adjacent tubes 4. The number of aligned spacer elements 14 arranged between two tubes 4 may depend on the total length L of the bundle 10. The longer the tubes 4 and the bundle 10, the more aligned spacer elements 14 may be provided between adjacent tubes 4.

Moreover, the spacer elements 14 may be arranged closer to each other at the hot end portion 9 of the bundle 10 than at the cool end portion 11 of the bundle 10 due to a lower stability of the tubes 10 at the hot end portion 9 than at the cool end portion 11.

In the illustrated embodiments, the spacer elements 14 comprise tubular elements arranged along the tubes 4. In this manner, during use of the electric heater 2, fluid flowing outside the tubes 4 may flow through the tubular elements of the spacer elements 14. Thus, the spacer elements 14 provide a low flow resistance in comparison with solid spacer elements.

The spacer elements 14 are shown as tubular elements having a circular cross section. Tubular elements having other cross sections, such as oval, square, etc. may alternatively be used.

Each of the tubular spacer elements 14 may have an extension along the axial extension 12 with in a range of 1%-30% of the total length L of the bundle 10.

According to alternative embodiments, solid spacer elements may be used. In such embodiments, the fluid flowing outside the tubes will flow around the solid space elements. Such elements have preferably a low pressure drop, as achieved by spherical or torpedo shapes.

The tubes 4 comprise structural elements 16 configured for form-locking engagement with the spacer elements 14. The form-locking engagement ensures that the spacer elements 14 remain positioned in relation to the tubes 4 within the bundle 10.

The structural elements that engage form locking with the spacer elements 14 in the FIG. 1*b* embodiments are not visible. The structural elements 16 that are visible in FIG. 1*b* may be utilised in other arrangements of the tubes 4 such as e.g., when more tubes 4 are to be added to the bundle 10.

The form-locking engagement may be utilised already when assembling the bundle 10 during production of the heater 2. Thus, during production of the heater 2, the spacer elements 14 and the tubes 4 may be fixedly positioned in relation to each other.

Further, during use of the heater 2, it is insured that the spacer elements 14 remain positioned within the bundle 10. In particular, the form-locking engagement ensures the relative position between the spacer elements 14 and the tubes 4 when the tubes 4 are subjected to thermal movements, such as elongation and contraction.

In the illustrated embodiments, the structural elements 16 are protrusions protruding radially from the tubes 4. The spacer elements 14 are provided with suitably sized holes or recesses into which the protrusions extend. Since the tubes 4 abut against the spacer elements 14 in the bundle 10, the protrusions extending into the holes, a form locking engagement is assured between the spacer elements 14 and the tubes 4.

The structural elements 16 may take any other suitable form and may comprise one or more of pins, plates, grooves, recesses, and/or disc segments configured to hold the spacer elements 14 in their axial positions within the bundle. The spacer elements 14 may comprise suitable elements, and/or features, and/or be shaped in a suitable manner for form-locking engagement with the one or more of pins, plates, grooves, recesses and/or disc segments.

The electrical connectors 6 arranged between the tubes 4 are arranged at opposite axial end portions 9, 11 of the bundle 10. The tubes 4 may be serially connected via the electrical connectors 6.

The electrical connectors 6 may be welded to the tubes 4. The electrical connectors 6 may be made from the same material as the tubes 4 or may be made from a different material than the tubes 4.

The electrical connectors 6 may be arranged at respective outermost ends, seen along the axial extension 12, of the axial end portions 9, 11.

The electrical connectors 6 may take any suitable form as long as they provide electrical connections between the tubes 4 dimensioned for the relevant electrical currents. The electrical connectors 6 may comprise one or more of a plate, pin, clamp, or bar. The electrical connectors 6 may be welded, brazed, screwed, or clamped to the relevant tubes 4.

A further option may be for the electrical connectors to be realized as discussed below with reference to FIG. 6.

The plurality of electrically conductive tubes 4 may be an even number of tubes 4. The electrical conductors 8 configured for connecting the plurality of tubes 4 with an external electric power supply 13 may be arranged at one axial end portion 11 of the bundle 10.

Thus, when the tubes 4 are serially connected, the current flowing through the tubes 4 during use of the heater 2 have a vectoral sum equalling zero.

The external electric power supply 13 may be an AC or a DC electric power supply. Preferred designs could be directly connected to line voltage such as 115-990 V, but also a range of 50 to 20.000 V may be appropriate in some heaters.

The tubes 4 may consist of a non-ceramic material. The tubes 4 may consist of an electrically conducting material for active resistance heating or more than one electrically conducting material for active resistance heating. The electrically conducting material may be the same in all the tubes 4 or different and may be selected from the group of iron-chromium-aluminium alloy (FeCrAl alloy), nickel-based alloy, tungsten-based alloy, or molybdenum-based alloy.

Accordingly, the heater 2 may be operated at high temperatures. See further the example embodiments discussed below.

The tubes 4 as such may be manufactured by conventional methods, such as rolling, or by using additive manufacturing technique using powder.

According to some embodiments, wherein the tubes 4 may be designed and arranged for a specific energy transfer within a range of 20-200 kW/m$^2$ or 30-120 kW/m$^2$ to the fluid to be heated. Accordingly, a compact heater structure may be provided. See further the example embodiments discussed below.

The heat transfer surfaces utilised in the heater 2 include the inner and outer surfaces of the tubes 4.

During use of the heater 2, the plurality of electrically conductive tubes 4 may be configured to be electrically heated up to a temperature of 1300° C., such as up to a temperature within a range of 600-1300° C.

Higher tube temperatures of more than 2000° C. may be achieved for Molybdenum-based or Tungsten-based alloys.

Figure 6:
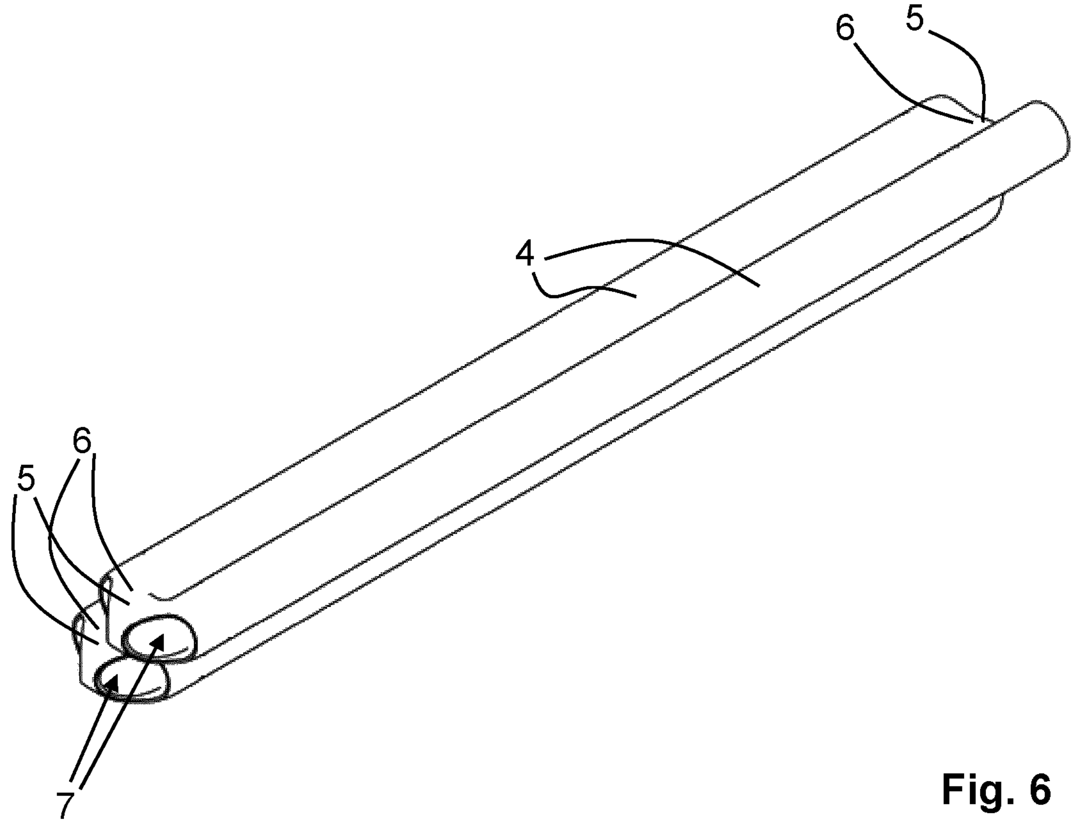

FIG. 6 schematically illustrates four adjacent electrically conductive tubes 4 of a heater according to embodiments. The heater may be a heater 2 as discussed above with reference to FIGS. 1*a* and 1*b*.

Again, the tubes 4, together with further tubes, are arranged in a bundle.

In these embodiments, the tubes 4 and the electrical connectors 6 between the tubes 4 are provided by utilising one or more tube blanks having a length substantially longer than the axial extension of the bundle in which the tubes 4 are arranged.

During manufacturing of the tubes 4, the tube blanks are bent to lengths corresponding to the desired tube length in the bundle. The resulting bends 5 of the tube blank are provided with through holes 7 e.g., by drilling, to allow the fluid to flow through the insides of the tubes 4 during use of heater. The bends 5 will act as electrical connectors 6 between the tubes 4 in the bundle.

This may provide an efficient way of connecting the tubes 4 using the bends 5 of the tubes as connectors 6. These connectors 6 may have the same outer and/or inner diameters as the tubes 4.

As mentioned above, the connectors 6 may be manufactured by bending, such as hot bending, a tube blank and machining holes into the bends 5.

An alternative way of providing electrical connectors between the tubes may be to pre-fabricate bent tube portions corresponding to the above discussed bends 5 by casting or additive manufacturing and welding the pre-fabricated bent tube portions to the ends of individual tubes. Four tubes provided in this manner would look similar to the four tubes 4 shown in FIG. 6.

Figure 2:
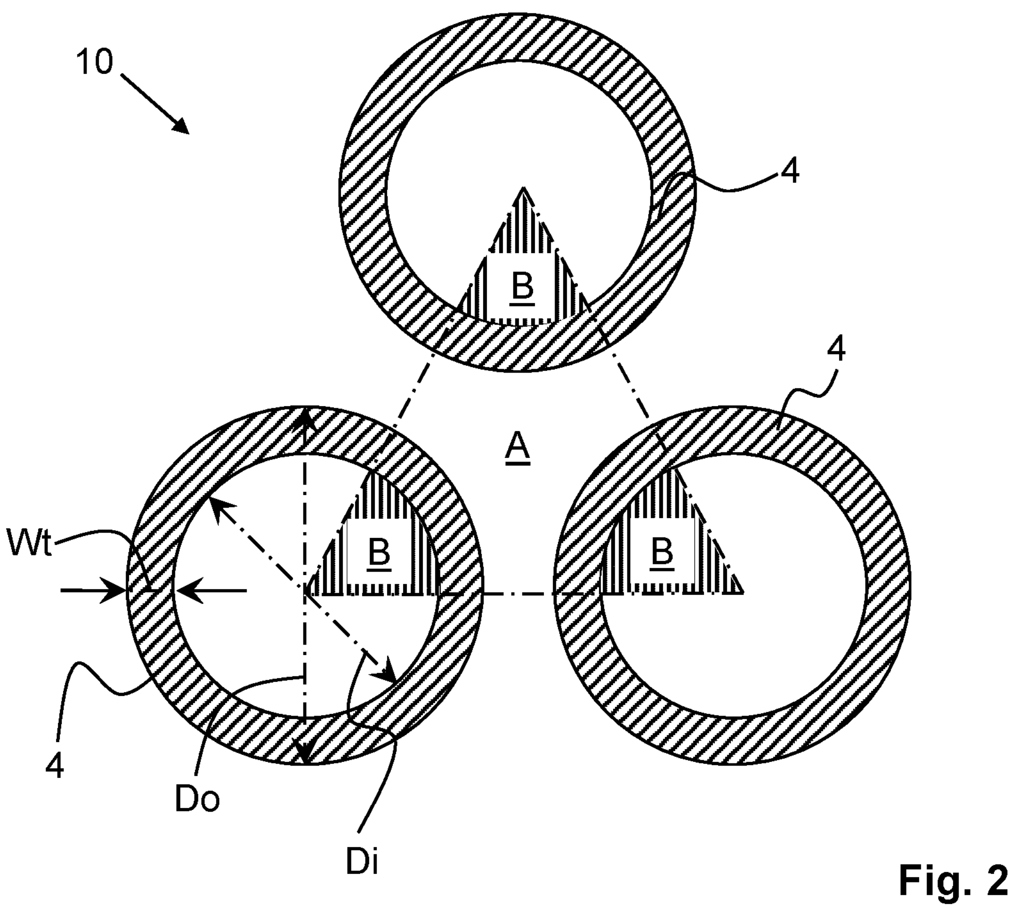
FIG. 2 schematically illustrates a cross-sectional view of three tubes of an electric heater, FIG. 3 schematically illustrates a side view of an end portion of an electric heater.

FIG. 2 schematically illustrates a cross-sectional view of three adjacent tubes 4 of the heater 2 shown in FIGS. 1*a* and 1*b*. The three tubes 4 form part of a bundle 10 of tubes 4.

The tubes 4 have particular dimensions and are positioned in relation to each other such that a high heat transfer to the fluid per volume of the heater 2 is provided i.e., a compact heater 2 and high outlet temperatures are achieved.

Firstly, each tube 4 has an outer diameter, Do, within a range of 6-40 mm and a wall thickness Wt. The ratio of outer diameter to wall thickness Do/Wt=SDR, Standard Dimensional Ratio, is within a range of 5-15 or within a range of 7-12. Accordingly, the tubes 4 are thin-walled tubes, which provide large heat transfer surfaces and even temperature distribution between radially inner and outer tube surfaces.

Secondly, in a cross section of the bundle 10 perpendicularly to the axial extension 12 i.e., as shown in FIG. 2, a ratio between a total cross-sectional surface area, A, in between the tubes 4 and a total cross-sectional area, B, inside the tubes 4 lies within a range of −10% to +30% or within a range of −5% to +25% of a ratio between the outer diameter, Do, and an inner diameter, Di, of one of the tubes 4.

The resulting Ratio' (including the respective ranges) may be expressed with equations (1) and (2) below, wherein x represents a factor describing the previously mentioned ranges, while Ratio represents the nominal ratio:

$$\text{Ratio} = \frac{D_o}{D_i} = \frac{A}{B} = \frac{\text{Outer cross section}}{\text{Inner cross section}} \tag{1}$$

$$\text{Ratio}' = \text{Ratio} * x;\ \{x \in \mathbb{R};\ 0.9 \le x \le 1.3\};\ \text{or} \quad \text{Ratio} * x;\ \{x \in \mathbb{R};\ 0.95 \le x \le 1.2\} \tag{2}$$

One way of arranging the tubes 4 in relation to each other in the bundle 10 is in an equidistant triangle arrangement. A centre-to-centre distance between the tubes 4 in an equidistant triangle arrangement may be expressed in equation (3) as the spacing:

$$\text{Spacing} = \sqrt{\frac{\pi D_o^2}{2\sqrt{3}}\left(\frac{x}{\text{Ratio}} + 1\right)} \tag{3}$$

A spacing according to equation (3) provides the opportunity to manufacture heater bundles in a reasonable, economical way, while further compensating tolerances introduced through the manufacturing processes. Furthermore, a spacing dependent on the ratio, with respect to the variation range, gives room for optimization of the heat transfer and pressure drop regarding connector 6 and spacers 14. This leads to customized systems, specific to customer requirements, while retaining its unique design.

Herein, the centre-to-centre distance of the tubes 4 in an equidistant triangle arrangement is given for a number of example heaters.

Each tube 4 of the plurality of tubes 4 may have the same outer diameter Do and the same SDR. Alternatively, the tubes 4 may have substantially the same outer diameter Do and substantially the same SDR, such as the Do and the SDR each varying with a range of ±5%.

An example of a heater wherein the above-mentioned expression, A/B=Do/Di, is fulfilled has an outer tube diameter, Do, 17.15 mm, and inner tube diameter, Di, 12.53 mm, and SDR of 7.424, which results in Do/Di=1.369. With a centre-to-centre spacing between the tubes of 21.48 mm the cross-sectional area outside the tubes, A, is 84.37 $mm^2$ and the cross-sectional area inside the tubes, B, is 61.62 $mm^2$. Accordingly, A/B=1.369=Do/Di.

In FIG. 2 the cross-sectional area A outside the tubes 4 is indicated with dash-dotted lines between the tubes 4. The cross-sectional area B inside the tubes 4 is indicated with vertical hatchings. The relationship between the cross-sectional areas outside and inside the tubes 4, A/B, is schematically illustrated with reference to only three tubes 4 of the bundle 10. The relationship may be illustrated in an analogous manner with more than three tubes 4 within the bundle 10.

The relationship between the cross-sectional area, A, in between the tubes 4 i.e., the cross-sectional area outside of the tubes 4 within the bundle 10, and the cross-sectional area inside, B, the tubes 4, defined in relation to the outer and inner diameters of the tubes 4 provides for a substantially even distribution of the flow rate of fluid (volume or mass per unit time) along the heat transfer surfaces provided by the insides of the tubes 4 and along the heat transfer surfaces provided by the outsides of the tubes 4 in the bundle 10. Accordingly, available fluid contacting heat transfer surfaces on insides and outsides of the tubes 4 are efficiently utilised for heating the fluid flowing through the electric heater while stress in the walls of the tubes 4 caused by radial temperature differences is avoided.

FIG. 3 schematically illustrates a side view of the hot end portion 9 of the heater 2 shown in FIGS. 1*a*, 1*b*, and 2.

Again, the tubes 4, the electrical connectors 6 between the tubes 4, and the supporting elements 14 between the tubes 4 are shown.

The electric heater comprises bracing elements 18 arranged within the tubes 4. The bracing elements 18 mechanically support the tubes 4. In particular, the tubes 4 benefit from such mechanical support within the tubes 4 when the electric heater is operated at such high temperatures that the tubes 4 lose at least some of their inherent stability.

The bracing elements 18 may comprise the same material as the tubes 4. In such case, the bracing elements 18 of each tube 4 may be formed in one piece with the relevant tube 4. Alternatively, the bracing elements 18 may be positioned in the tubes 4 after their forming.

An alternative may be for the bracing elements 18 to comprise a non-conductive heat resistant material, such as a ceramic material. Such bracing elements 18 may be positioned inside the tubes 4 e.g., in connection with assembly of the electric heater.

The bracing elements 18 are formed such that during use of the heater, a fluid flow through the insides of the tubes 4 is affected as little as possible. Suitably, members 20 of a bracing element 18 extend axially along an axial extension of a relevant tube 4. In a circumferential direction, such members 20 only have a minor extension.

In the illustrated embodiments, the bracing elements 18 are provided with three radially extending members 20. However, a bracing element may have less or more than three radially extending members or any other shape as long as a bracing element prevents collapse of a tube 4 and low additional pressure drop.

The use of bracing elements 18 may be a balance between the pressure drop they add to the flow of fluid inside the tubes 4 and the support they provide to the tubes 4.

According to embodiments, the bracing elements 18 may be arranged within the last 40% of a total length L of the tubes 4 seen in a flow direction of the fluid to be heated. That is, the bracing elements 18 may be arranged at, or close to, the hot end portions 9 of the tubes 4, which hot end portions 9 accordingly, may be supported as the tubes 4 may lose some of their inherent stability during use of the heater.

The total length L of the tubes 4 is indicated in FIG. 1*a*. and may correspond substantially to the total length L of the bundle 10. The bracing elements 18 being arranged within the last 40% of the total length L of the tubes 4 encompasses the bracing elements 18 being arranged within the last 30% or the last 20% or even less.

Each bracing element 18 may have a length of 40% or less of the total length L of the relevant tube 4. Alternatively, each bracing element 18 may be short in comparison with the total length L of a relevant tube 4, such as less than 10% or less than 5% of the total length. One or more such short bracing elements 18 may be arranged within the last 40% of the total length of a relevant tube 4.

Figure 4:
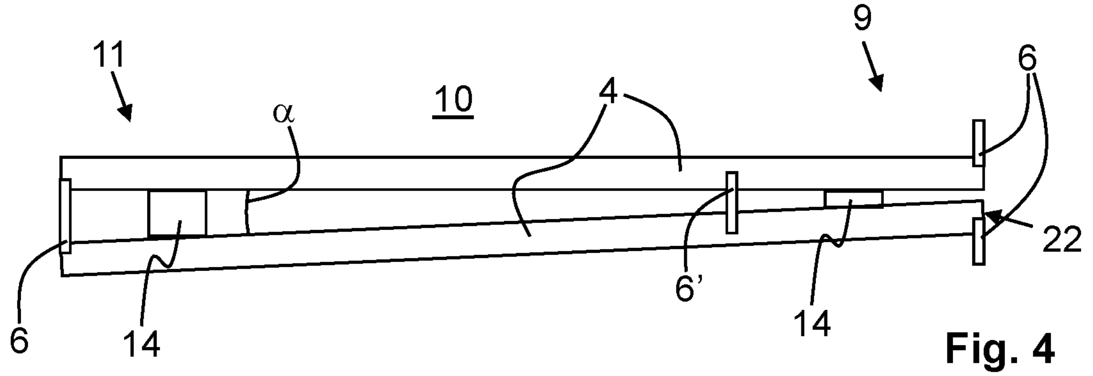
FIG. 4 illustrates two tubes of an electric heater according to embodiments, FIG. 5 schematically illustrates embodiments of an electric heating system for a fluid, and FIG. 6 schematically illustrates tubes of a heater according to embodiments.

FIG. 4 illustrates two tubes 4 of an electric heater according to embodiments.

The heater resembles in much the heater of the embodiments of FIGS. 1*a*-3. Accordingly, in the following mainly the differences will be discussed.

Again, the heater comprises a plurality of electrically conductive tubes 4 arranged in a bundle 10, electrical connectors 6 between the tubes 4, and supporting elements 14 between the tubes 4. The bundle 10 has an axial extension 12.

According to embodiments, each tube 4 of the plurality of electrically conductive tubes 4 may be arranged at an angle α within a range of 0-15 degrees or 0-10 degrees or 0-5 degrees to an adjacent tube 4.

In the above discussed embodiments of FIGS. 1*a*-3, the tubes 4 of the plurality of electrically conductive tubes 4 are arranged in parallel to each other and in parallel with the axial extension of the bundle 10. That is, the angle α is 0 degrees in the embodiments of FIGS. 1*a*-3.

In the embodiments of FIG. 4, the angle α between adjacent tubes 4 is >0 degrees, such as within a range of 0.5-15 degrees. Put differently, at least some of the tubes 4 are arranged inclined to each other in the bundle 10 of tubes 4.

For instance, when the heater is arranged with the axial extension 12 of the bundle 10 extending vertically or arranged having a vertical component, the individual tubes 4 stabilise each other within the bundle due to the tubes 4 being arranged with the angle α>0 degrees, such as within a range of 0.5-15 degrees to each other.

The angle α>0 degrees between the tubes 4 may be achieved by arranging differently sized spacer elements 14 at opposite end portions of the bundle 10.

According to some embodiments, the angle α>0 degrees between the tubes 4 provides a conical or spherical shape of the bundle i.e., the bundle has a larger cross section at one end portion than at the other end portion. With the tube diameters the same along the length of the bundle, the conical shape entails that the cross-sectional area between the tubes 4 is reduced towards one end of the bundle, suitably towards the outlet end of the bundle during use of the heater. Such a reduction in cross-sectional area means that the fluid velocity will increase towards the outlet end of the bundle. The average velocity change from the cold end portion 11 (inlet) to the hot end portion 9 (outlet) at a constant angle still remains constant, so that the pressure drop will be kept consistent inside and outside the tubes and still provides a valid functionality of the invention.

At the outlet end, the tube temperature inherently is higher than at the inlet end. The increased fluid velocity towards the outlet end has an effect of an increase in heat transfer and therefore, more cooling of the tubes 4 and a reduction in temperature of the outlet end in comparison with a bundle wherein the tubes are arranged in parallel with each other. The reduced temperature reduces aging of the tubes 4 i.e., the operational life span of the tubes 4 is increased.

In FIG. 4 also a further electrical connection alternative is illustrated. This electrical connection alternative is not limited to the FIG. 4 embodiments but may alternatively be applied in the FIG. 1*a*-3 embodiments. Similarly, the electrical connectors 6 as applied in the FIG. 1*a*-3 embodiments may be applied in the FIG. 4 embodiments.

The electric heater comprises a further set of electrical connectors 6' arranged between the tubes 4 at a distance form an axial end 22 of the bundle 10. The further set of electrical connectors 6' together with the electrical connectors 6 form parallel connections between the tubes 4 at an axial end portion 9 of the bundle 10.

In this manner, the electrically parallel connected portions of the tubes 4 are only subjected to a fraction of the electric current as the remaining portions of the tubes 4 not connected in parallel. Thus, the surface load of the parallel connected portions of the tubes 4 is reduced in comparison to the remaining portions of the tubes 4. That is, the heating and the power transfer per surface area is reduced at the axial end portion 9. This may be advantageous at the hot end portion 9 of the bundle 10 since the temperature at that end portion is reduced in comparison with a bundle without electrically parallel connected portions of the tubes. Accordingly aging of the tubes 4 is reduced.

Figure 5:
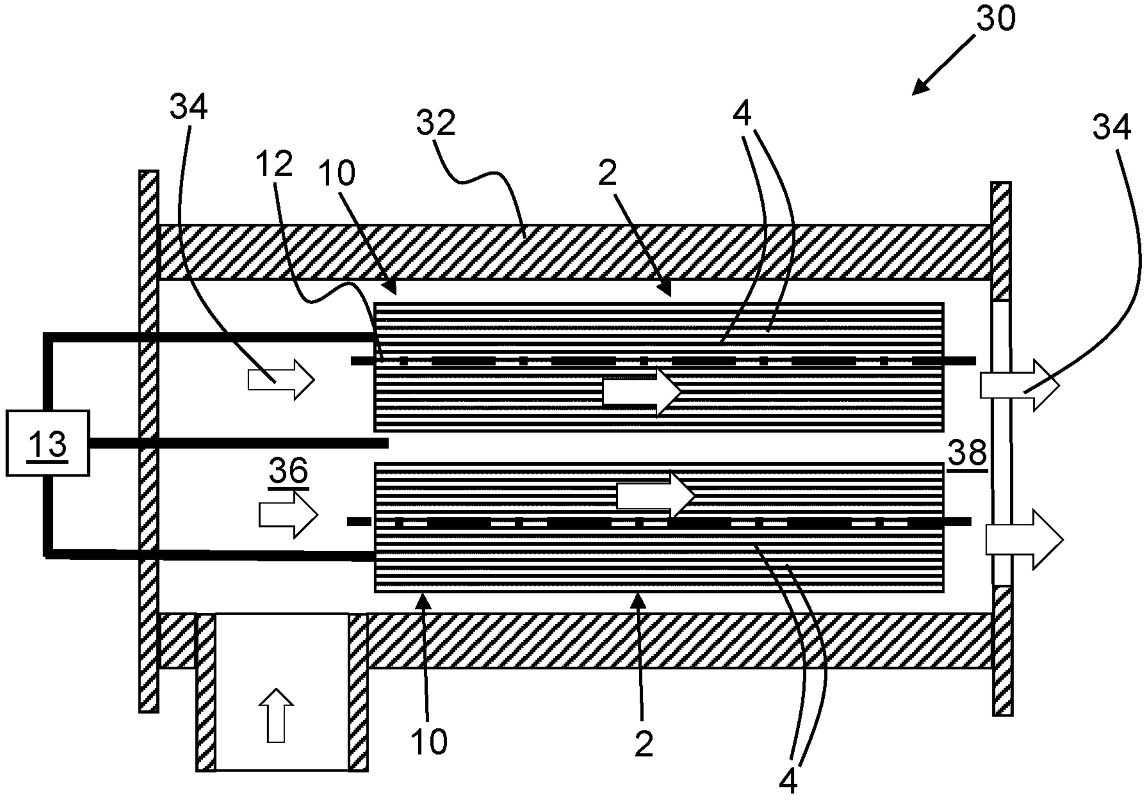

FIG. 5 schematically illustrates embodiments of an electric heating system 30 for a fluid. FIG. shows a cross-section through the electric heating system 30. Reference is also made to FIGS. 1*a*-4, and 6.

The electric heating system 30 comprises a housing 32 and at least one electric heater 2 according to any one of aspects and/or embodiments discussed herein, such as any heater discussed above with reference to FIGS. 1*a*-4, and 6.

The at least one electric heater 2 is arranged in the housing 32. A flow path 34 for the fluid to be heated extends through the bundle 10 formed by the plurality of tubes 4 of the at least one heater 2 and along the axial extension 12 of the bundle 10. Optionally, the housing 32 may comprise an insulation or refractories to insulate against the high temperature inside the heating system 30 and may provide proper electrical insulation as well.

Each heater 2 is supported in the housing 32 by one or more supporting arrangements (not shown). Also, one or more flow limiting members (not shown) may be provided within the housing 32 around each heater to ensure that the fluid to be heated will flow along the flow path 34 through the bundle 10 of each heater 2.

In FIG. 5, two heaters 2 are visible. Optionally, a third heater and further heaters may be arranged in the housing 32. The flow path 34 is indicated with broad arrows.

When the two or more heaters 2 are arranged in parallel, as in the illustrated embodiments, the flow path 34 extends in parallel through the heaters 2.

Accordingly, the electric heating system 30 may comprising at least two electric heaters 2 according to any one of aspects and/or embodiments discussed herein. The flow path 34 may extend through the at least two electric heaters 2 in parallel and the at least two electric heaters 2 may be electrically connected in parallel, in star connection, in delta connection, or combinations thereof. In this manner, an efficient electric heating system 30 with high fluid flow capacity may be provided. The electric heating system 30 may be efficiently connected via the electrical conductors (not shown) of each heater 2 with an external electric power supply 13.

Each of a star connection and a delta connection requires at least three electric heaters 2 in the heating system 30.

Inside the housing 32, there may be arranged an inlet chamber 36 upstream of the heaters 2 and an outlet chamber 38 arranged downstream of the heaters 2. The flow path 34 extends from the inlet chamber 36 via the heaters 2 to the outlet chamber 38.

The inlet chamber 36 may be considered to form a manifold for distributing a collective fluid stream to the individual heaters 2 and their respective bundles 10 of tubes 4. Similarly, the outlet chamber 38 may be considered to form a manifold for converging the distributed fluid streams in the heaters 2 back into one collective fluid stream. Along the flow path 34 in the heaters 2, the fluid is heated as it flows along inside and outside surfaces of the tubes 4.

An electric heater 2 according to aspects and/or embodiments discussed herein and/or an electric heating system 30 according to aspects and/or embodiments discussed herein may be utilised for heating a fluid, such as a gas, in an industrial process.

The heated fluid may for example be utilised in an industrial process. The fluid heated in the heater 2/system 30 may be an energy carrier in an industrial process and/or the fluid may be utilised as a heat source in an industrial process and/or the heated fluid may be a process fluid of an industrial process.

In the following, three example heating implementations and example embodiments of the electric heater 2 or the electric heating system 30 will be discussed. Reference is made to FIGS. 1*a*-6.

The present heater 2/system 30, due to the above discussed high SDR tubes and relationship between quotient of outer and inner cross-sectional areas and quotient of outer and inner diameters of tubes provide high surface to fluid flow ratios. Accordingly, the heater 2/system 30 can be designed for minimal size while considering fluid flow properties.

Using the above discussed materials, the tubes 4 may withstand high temperatures up to 1400° C. or 2050° C. However, lower temperatures, such as the above discussed temperature of 1300° C. or range of 600-1300° C. may increase life-time expectancy of the heater 2/system 30.

Examples 1-4 demonstrate how different flow properties and boundary conditions affect the design of a heater 2/system 30. Various fluids and tube diameters are considered, and their performance illustrated.

Example 1

Example 1 relates to heated dry air. Many conventional industrial processes require hot air. The Example 1 heater 2/system 30 comprises 6120 tubes 4 with an outer diameter, Do, of 17.15 mm, an SDR of 7.4, and a tube centre-to-centre distance of 22 mm in an equilateral triangular arrangement. The tubes 4 have a length of 0.9 m and are arranged in a 1.55 m by 1.68 m duct. The heater 2/system 30 is devised for 51 MW electrical power.

A surface load of 101 kW/m$^2$ is provided by the heater 2/system 30. The heater 2/system 30 ensures high energy density and thereby provides compact dimensions of the heater 2/system 30. In this example, a mass flow rate of 76 kg/s of dry air with an inlet temperature of 45° C. is heated to an outlet temperature of 800° C. A maximum tube 4 temperature of the heater 2/system 30 is 1200° C.

Example 2

Example 2 relates to a hydrogen mixture comprising 95% H2 and 5% N2. In Example 2, smaller outer diameter heating tubes than in Example 1 are utilised but at similar surface loads. Furthermore, the heater 2/system 30 dimensions are reduced due to smaller tube diameter as well as the gas properties, in comparison with Example 1. Still, higher outlet temperatures can be achieved.

The Example 2 heater 2/system 30 comprises 20,286 tubes 4 with an outer diameter, Do, of 6 mm, an SDR of 6, and a tube centre-to-centre distance of 7.50 mm in an equilateral triangular arrangement. The tubes 4 have a length of 0.85 m and are arranged in a 1.0 m by 0.99 m duct. The heater 2/system 30 is devised for 51 MW electrical power.

A surface load of 100 kW/m$^2$ is provided by the accordingly, compact heater 2/system 30. In this example, a mass flow rate of 1.45 kg/s of a gas containing 95% H2 and 5% N2 with an inlet temperature of 45° C. is heated to an outlet temperature of 1000° C. A maximum tube 4 temperature of the heater 2/system 30 is 1200° C.

Example 3

Example 3 relates to carbon dioxide. Heated carbon dioxide is another gas commonly used fluid in industrial processes. By using 40 mm tubes, high gas outlet temperatures at reasonable heater 2/system 30 size are achievable at higher mass flows.

Accordingly, the Example 3 heater 2/system 30 comprises 1,320 tubes 4 with an outer diameter, Do, of 40 mm, an SDR of 13.3, and a tube centre-to-centre distance of 52 mm in an equilateral triangular arrangement. The tubes 4 have a length of 1.7 m and are arranged in a 1.7 m by 1.9 m duct. The heater 2/system 30 is devised for 51 MW electrical power.

A surface load of 106 kW/m$^2$ is provided in the heater 2/system 30. In this example, a mass flow rate of 145 kg/s of carbon dioxide with an inlet temperature of 45° C. is heated to an outlet temperature of 1100° C. A maximum tube 4 temperature of the heater 2/system 30 is 1200° C.

Example 4

Example 4 relates to the heating of a gas mixture, consisting of 95% $H_2$ and 5% $N_2$. Overheating processes for high quantities of low-density gases will play a more significant role in a decarbonized industrial field. Molybdenum heating elements allow for temperatures above 1100° C. By using tubes with an outer diameter of 15 mm, the heater 2 is able to superheat the mixture to 1300° C.

The Example 4 heater 2/system 30 comprises 14520 tubes with an outer diameter, Do, of 15 mm, an SDR of 6 and a tube centre-to-centre distance of 18.5 mm in an equilateral triangular arrangement. The tubes 4 have a length of 2.2 m and are arranged in a 2.1 m by 2.1 m duct. The heater 2/system 30 is devised for 100 MW electrical power.

A surface load of 40 kW/$m^2$ is provided in the heater 2/system 30. In this example, a mass flow rate of 16.7 kg/s of the hydrogen/nitrogen mixture with an inlet temperature of 700° C. is heated to an outlet temperature of 1300° C. A maximum tube 4 temperature of the heater 2/system 30 is 1380° C.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. An electric heater for a fluid, the electric heater comprising:

a plurality of electrically conductive tubes (4) arranged in a bundle for resistive heating having an axial extension, electrical connectors arranged between the tubes of the plurality of electrically conductive tubes, and electrical conductors configured for connecting the plurality of tubes with an external electric power supply, wherein the electric heater is configured for the fluid to flow through the bundle in parallel with the axial extension and in direct contact with inner and outer surfaces of the tubes, wherein each of the tubes has an outer diameter within a range of 6-40 mm and an outer diameter to wall thickness ratio within a range of 5-15 or within a range of 7-12, and wherein in a cross section of the bundle perpendicularly to the axial extension, a ratio between a total cross-sectional surface area in between the tubes and a total cross-sectional area inside the tubes lies within a range of −10% to +30% or within a range of −5% to +25% of a ratio between the outer diameter and an inner diameter of one of the tubes.

2. The electrical heater according to claim 1, wherein each tube of the plurality of electrically conductive tubes is arranged at an angle within a range of 0-15 degrees or 0-5 degrees to an adjacent tube.

3. The electric heater according to claim 1, comprising spacer elements arranged between the tubes to support the tubes in the bundle, wherein the spacer elements are electrically non-conductive, and wherein the spacer elements are arranged with interspaces along the axial extension of less than 40% of a total length of the bundle along the axial extension.

4. The electric heater according to claim 3, wherein the spacer elements comprise tubular elements arranged along the tubes.

5. The electric heater according to claim 3, wherein the tubes comprise structural elements configured for form-locking engagement with the spacer elements.

6. The electric heater according to claim 1, wherein the electrical connectors arranged between the tubes are arranged at opposite axial end portions of the bundle, and wherein the tubes are serially connected via the electrical connectors.

7. The electric heater according to claim 6, wherein the plurality of electrically conductive tubes is an even number of tubes, and wherein the electrical conductors configured for connecting the plurality of tubes with an external electric power supply are arranged at one axial end portion of the bundle.

8. The electric heater according to claim 1, comprising bracing elements arranged within the tubes for mechanically supporting the tubes.

9. The electric heater according to claim 8, wherein the bracing elements are arranged within the last 40% of a total length of the tubes seen in a flow direction of the fluid to be heated.

10. The electric heater according to claim 1, wherein the tubes are designed and arranged for a specific energy transfer within a range of 20-200 kW/$m^2$ or 30 to 120 kW/$m^2$ to the fluid to be heated.

11. The electric heater according to claim 1, wherein the tubes consist of an electrically conducting material for active resistance heating or more than one electrically conducting material for active resistance heating, and wherein the electrically conducting material is the same in all the tubes or different and is/are selected from the group of iron-chromium-aluminium alloy (FeCrAl alloy), nickel-based alloy, tungsten-based alloy, or molybdenum-based alloy.

12. The electric heater according to claim 1, comprising a further set of electrical connectors arranged between the tubes at a distance from an axial end of the bundle, wherein the further set of electrical connectors together with the electrical connectors form parallel connections between the tubes at an axial end portion of the bundle.

13. The electric heater according to claim 1, wherein the plurality of electrically conductive tubes is configured to be electrically heated up to a temperature of 1300° C., such as up to a temperature within a range of 600-1300° C.

14. The electric heater according to claim 1, wherein the plurality of electrically conductive tubes is configured to be electrically heated up to a temperature of 2050° C., such as up to a temperature within a range of 800-2050° C.

15. An electric heating system for a fluid, comprising:

a housing and at least one electric heater according to claim 1, wherein the at least one electric heater is arranged in the housing, and wherein a flow path for the fluid to be heated extends through the bundle and along the axial extension.

16. An electric heating system for a fluid, comprising:

a housing and at least two electric heaters according to claim 1, wherein the at least two electric heaters are arranged in the housing, wherein a flow path for the fluid to be heated extends through the bundle and along the axial extension, wherein the flow path extends through the at least two electric heaters in parallel, and wherein the at least two electric heaters are electrically connected in parallel, in star connection, in delta connection, or combinations thereof.

* * * * *